(12) United States Patent
Huang

(10) Patent No.: US 7,399,347 B2
(45) Date of Patent: Jul. 15, 2008

(54) CONTROL VALVE STRUCTURE FOR AN OXYGEN MACHINE

(76) Inventor: Shao-Shih Huang, 5F, No. 9, Lane 180, Tong Hua St., Da Ann Dist., Taipi (TW)

( * ) Notice: Subject to any disclaimer, the term of this patent is extended or adjusted under 35 U.S.C. 154(b) by 654 days.

(21) Appl. No.: 11/104,461

(22) Filed: Apr. 13, 2005

(65) Prior Publication Data
US 2006/0231145 A1    Oct. 19, 2006

(51) Int. Cl.
*F16K 11/074*    (2006.01)
(52) U.S. Cl. .................... 96/121; 128/205.24; 137/862; 137/596.16

(58) Field of Classification Search ............... 96/121, 96/133; 95/130; 55/418; 128/204.18, 204.21, 128/205.24; 137/862, 636.1
See application file for complete search history.

(56) References Cited

U.S. PATENT DOCUMENTS

| | | | | |
|---|---|---|---|---|
| 1,887,589 A | * | 11/1932 | Farmer .................... | 96/113 |
| 3,923,479 A | * | 12/1975 | Glass et al. ............. | 96/114 |
| 5,366,541 A | * | 11/1994 | Hill et al. .................. | 96/124 |
| 5,611,923 A | * | 3/1997 | Suri et al. ................ | 210/238 |
| 6,062,260 A | * | 5/2000 | Yoshimura et al. ..... | 137/596.16 |
| 6,068,680 A | * | 5/2000 | Kulish et al. ............. | 95/98 |

* cited by examiner

*Primary Examiner*—Frank M. Lawrence
(74) *Attorney, Agent, or Firm*—Rosenberg, Klein & Lee

(57) ABSTRACT

A control valve structure for an oxygen machine uses a motor to link a disc to spin, which activates a pair of valve rods to open and close in sequence through rotation of the motor to control air flow.

3 Claims, 6 Drawing Sheets

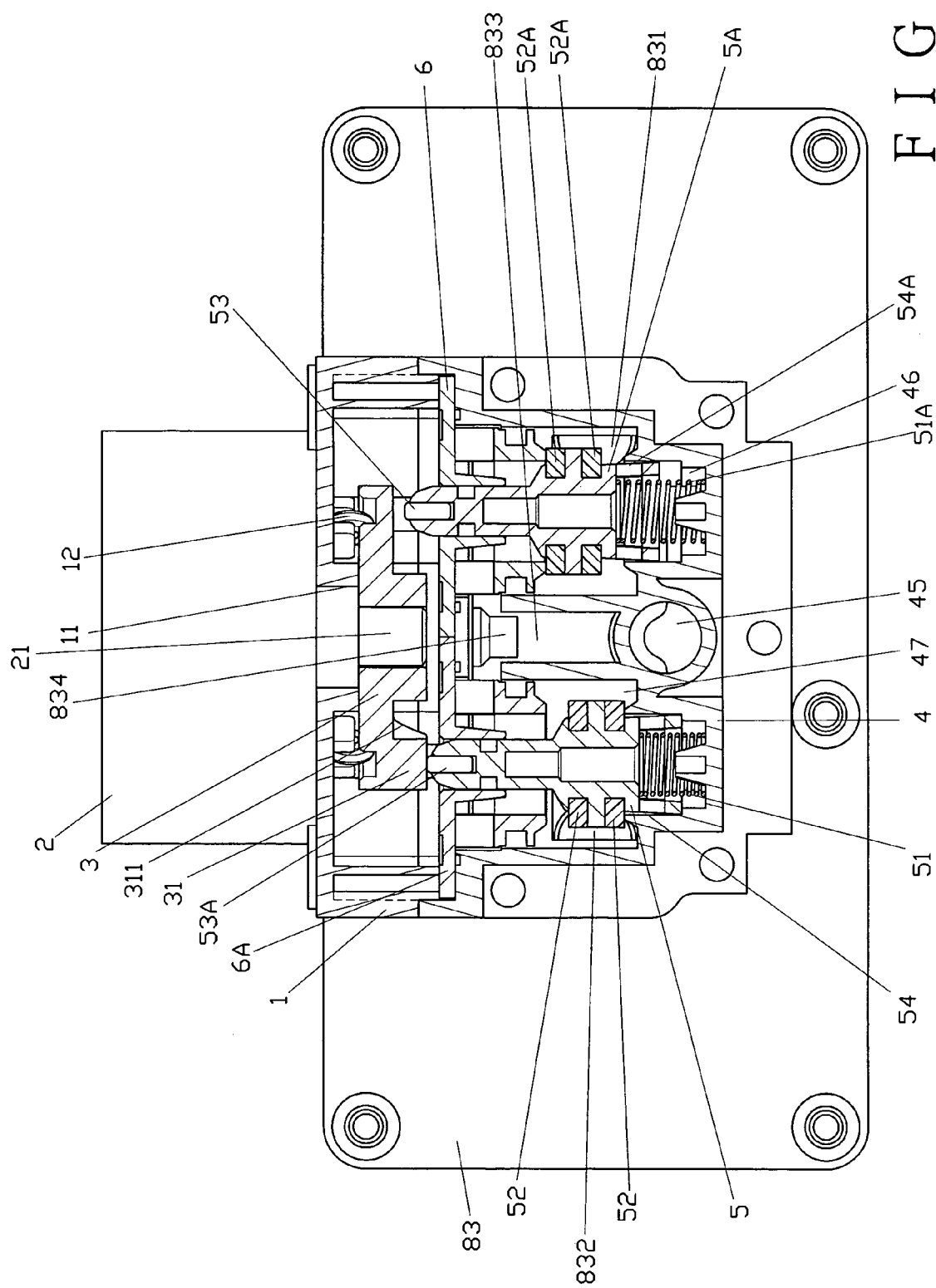

CONTROL VALVE STRUCTURE FOR AN OXYGEN MACHINE

BACKGROUND OF THE INVENTION

1. Field of the Invention

This invention relates to a control valve structure for an oxygen machine, and more particularly to a pair of valve rods activated by a disc of a motor to control air passages.

2. Description of the Prior Art

A conventional oxygen maker on the market uses an air compressor to suck air and to filter the air in the compressor before providing it to a user. The basic design is to suck air from outside into the compressor, and then filter the air to produce oxygen.

U.S. Pat. No. 6,062,260 discloses a pair of electromagnetic valves of an air inlet control valve to control two pistons in the control valve to move in sequence so that air flows in and out in a circle status.

However, should any of the electromagnetic valves is not functioning, the air flow in sequence is broken and air flow is out of control, thus oxygen can not be produced properly.

SUMMARY OF THE INVENTION

It is the primary object of the present invention to provide a control valve structure for an oxygen machine, which uses a motor to link a cam on a disc to rotate and controls two valve rods to move in a reciprocating movement. The design is simple and easy to operate.

It is another object of the present invention to provide a control valve structure for an oxygen machine, which operation can be controlled accurately.

It is a further object of the present invention to provide a control valve structure for an oxygen machine, which is easy to maintain.

BRIEF DESCRIPTION OF THE DRAWINGS

FIG. 6 is a cross-sectional view showing operation of the present invention.

DETAILED DESCRIPTION OF THE PREFERRED EMBODIMENT

Figure 1:
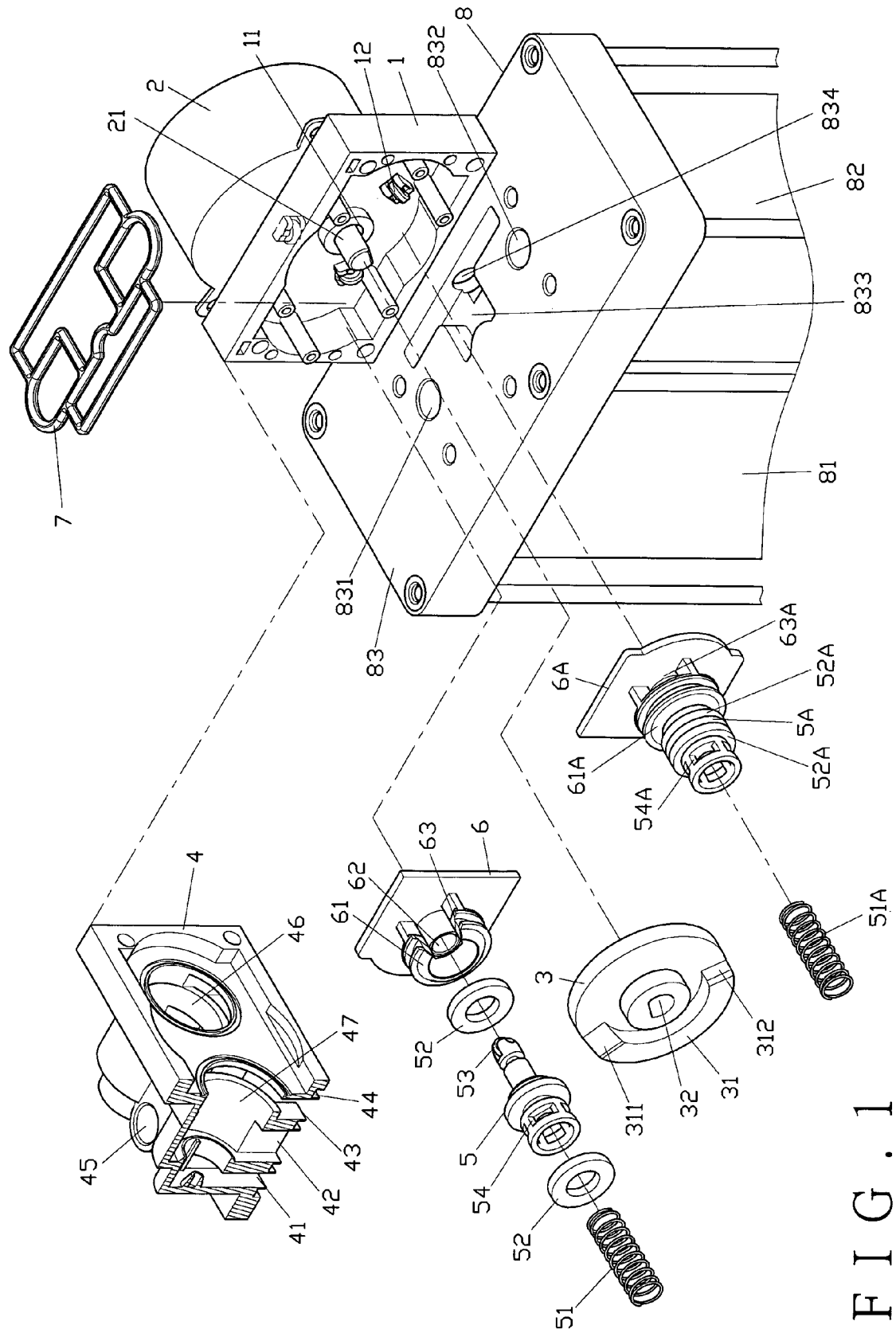
FIG. 1 is an exploded view of the present invention.

As shown in FIG. 1, the present invention comprises a valve seat 1, a motor 2, a disc 3, an air valve 4, a pair of first and second valve rods 5 and 5A, a pair of first and second valve rod seats 6 and 6A, a washer 7 and an air filter 8.

The valve seat 1 has a through hole 11 for a spindle 21 of the motor 2 to insert there through. The spindle 21 has a cut-off section at the front end. The valve seat 1 is provided with three pulleys 12 spaced from one another for the disc 3 to secure thereat.

The disc 3 has one side leaning on the pulleys 12 of the valve seat 1, while the other side of the disc 3 is formed with a half cam 31 having a first slanting surface 311 and a second slanting surface 312 on respective ends thereof, and a hole 32 at the center with a cut-off section corresponding to the cut-off section of the spindle 21.

Figure 2:
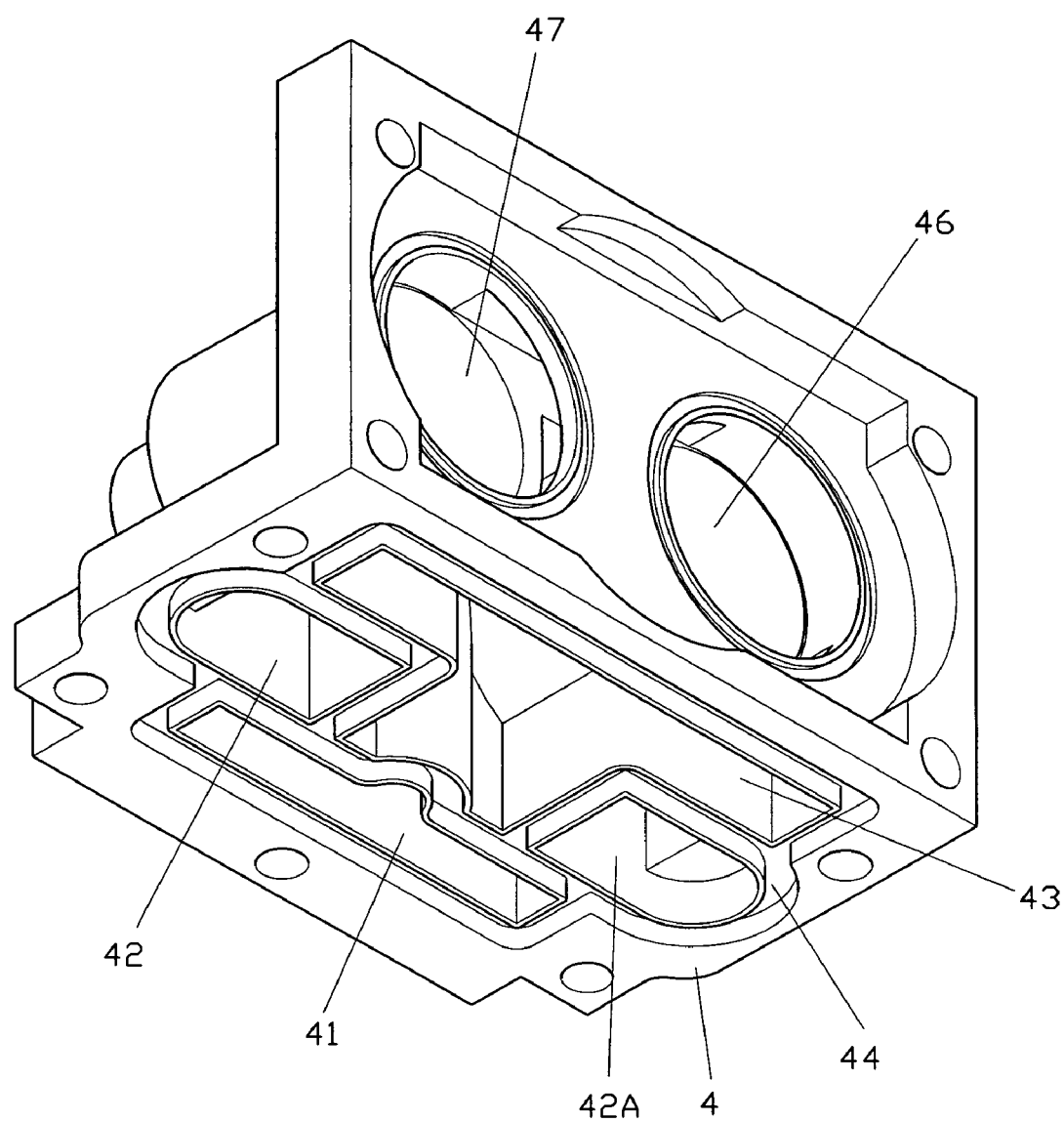
FIG. 2 is a perspective view of an air valve of the present invention

The air valve 4, as shown in FIG. 2, corresponds in shape to the valve seat 1 and comprises a first air chamber 41, a pair of second air chambers 42 and 42A, and a third air chamber 43. All of the air chambers are formed longitudinally thereon and separated from one another, and are surrounded with a trough 44. The air valve 4 further comprises an air inlet 45 interconnected with the first air chamber 41, and a first air hole 46 and a second air hole 47 transversally interconnected with the first air chamber 41, the second air chambers 42 and the third air chamber 43, respectively, to receive the first valve rod 5 and the second valve rod 5A therein.

Both the first valve rod 5 and the second valve rod 5A are sleeved with springs 51 and 51A, sealing rings 52 and 52A. One end of each of the valve rods 52 and 52A is provided with a pulley 53 and 53A, respectively, while the other end of which is formed with holes 54 and 54A, respectively.

Figure 3:
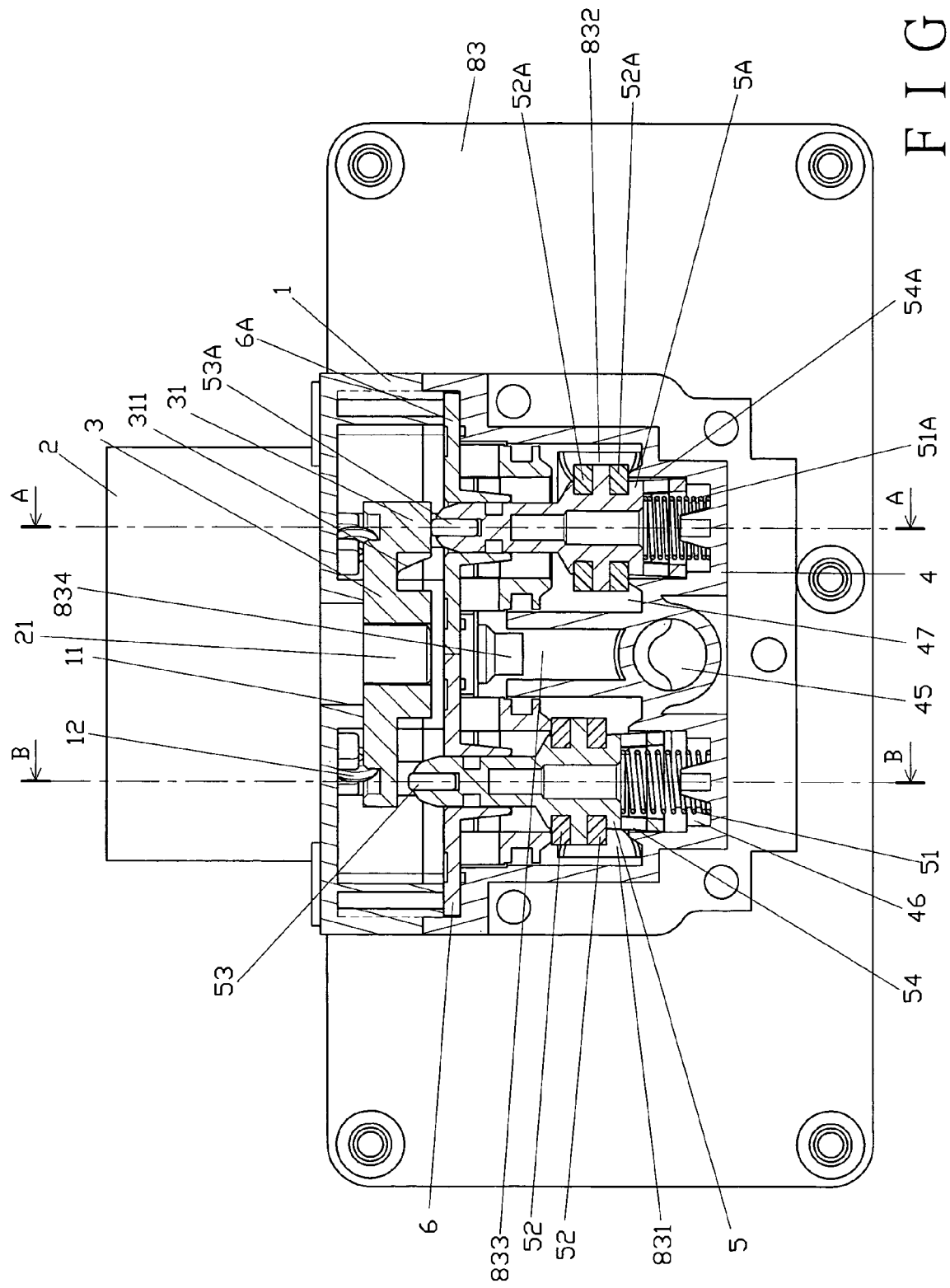
FIG. 3 is a cross-sectional view of the present invention.

Both the first valve rod seat 6 and the second valve rod seat 6A comprise a circular holders 61 and 61A with a barrel holders 62 and 62A therein, respectively, as shown in FIG. 3. The holders 61 and 61A comprise notches 63 and 63A at the bottom ends which are interconnected with the holders 61 and 61A.

The washer 7 is shaped to fit the trough 44 surrounding the first air chamber 41, the second air chambers 42 and 42A, and the third air chamber 43.

The air filter 8 comprises a pair of particle filters 81 and 82 and a base plate 83. The base plate 83 comprises a pair of holes 831 and 832 interconnected with the particle filters 81 and 82, respectively, and an exhausting chamber 833 having an exhausting hole 834 therein.

Figure 4:
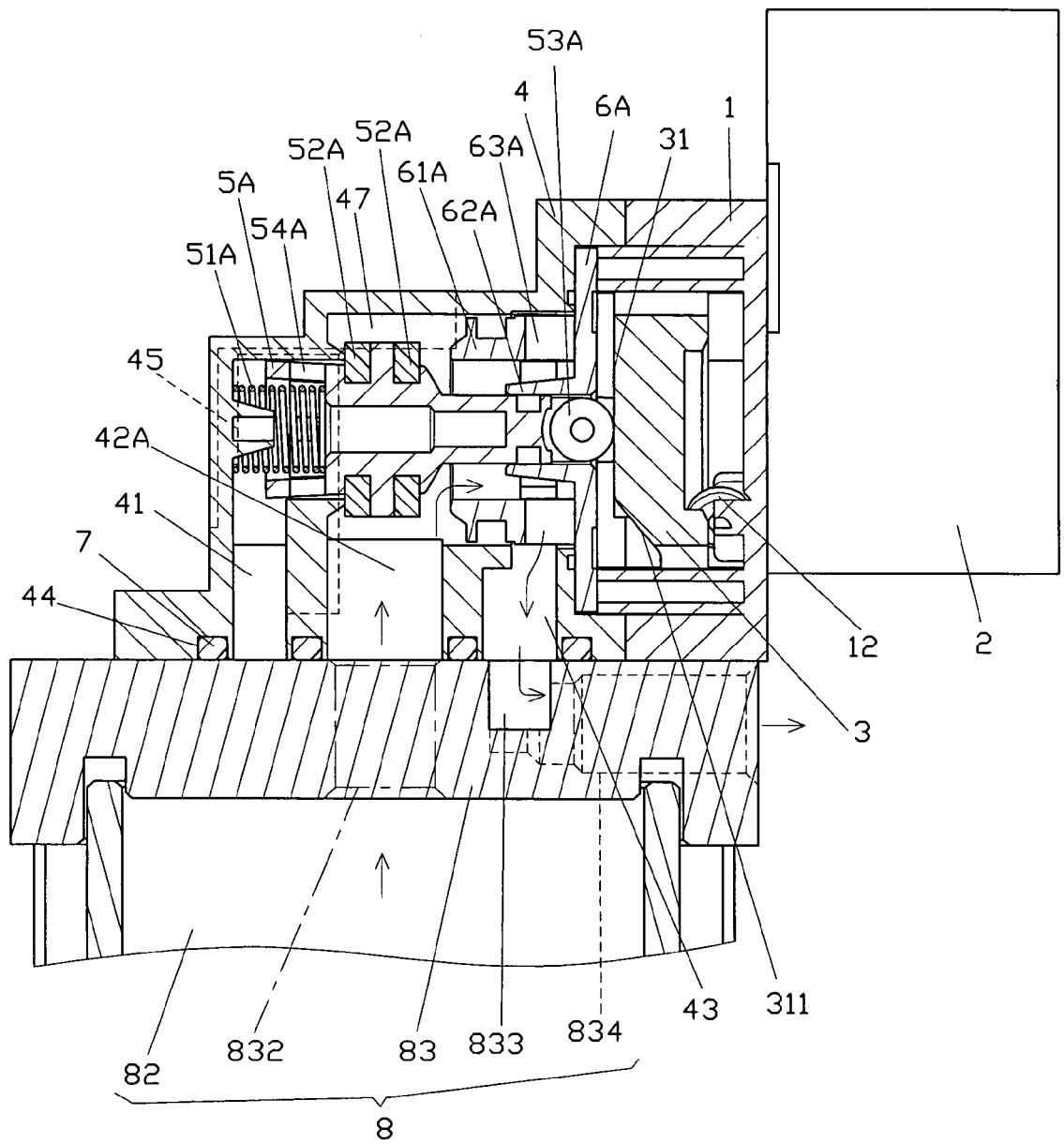
FIG. 4 is a cross-sectional view taken along line A-A of FIG. 3.
Figure 5:
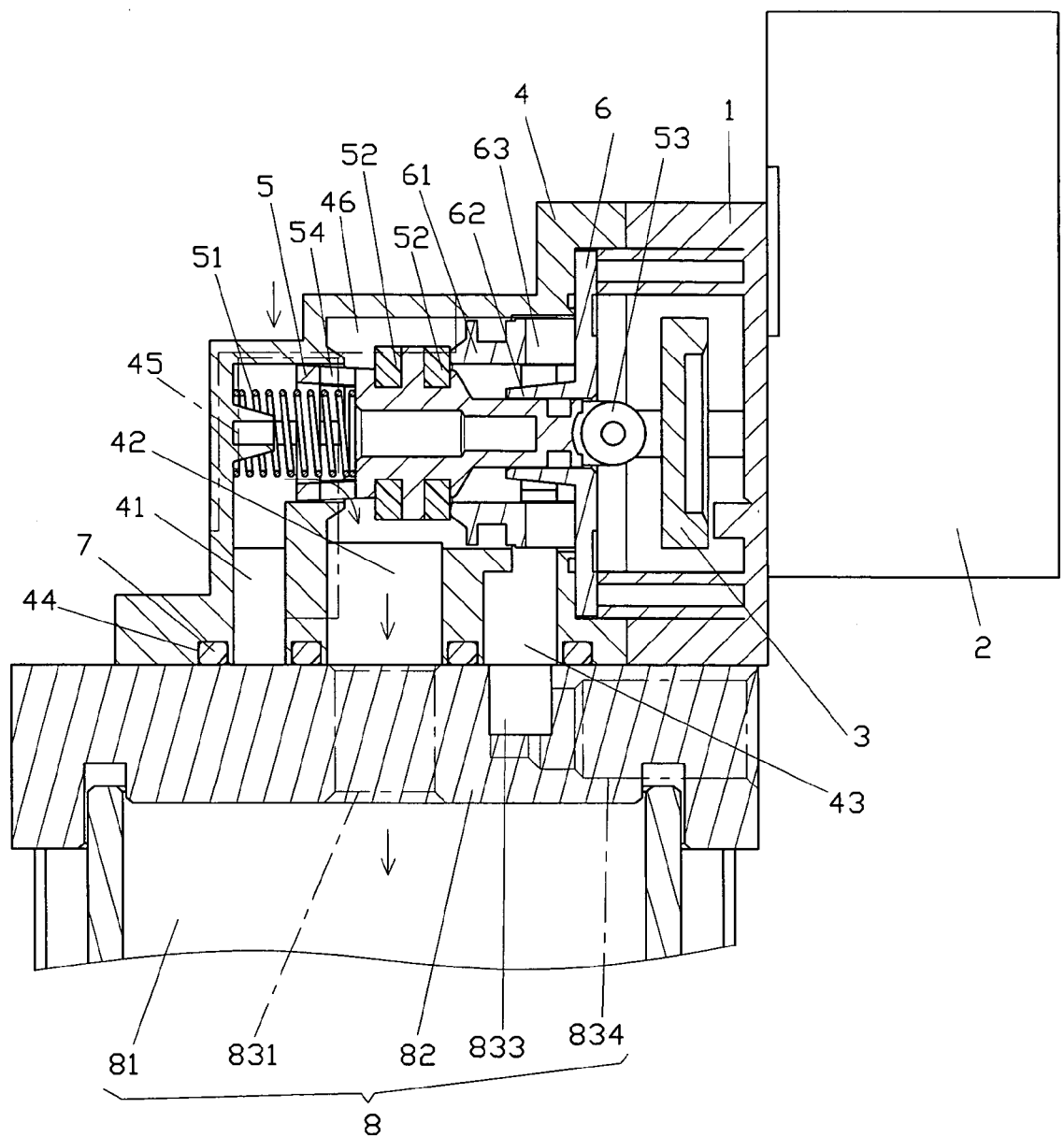
FIG. 5 is a cross-sectional view taken along line B-B of FIG. 3.

To install the present invention, as shown in FIGS. 3, 4, and 5, the spindle 21 of the motor 2 is inserted through the through hole 11 of the valve seat 1 and the hole 32 of the disc 3. Whereas the disc 3 has one side engaging with the pulleys 12 of the valve seat 1, when the motor 2 is activated, the pulleys 12 link the disc 3 to spin on the valve seat 1. The first valve rod 5 and the second valve rod 5A are inserted into the first valve rod seat 6 and the second valve rod seat 6A, and then inserted into the first air hole 46 and the second air hole 47, respectively, and stay at the intersections between the first valve rod seat 6 and the second valve rod seat 6A, the first air chamber 41, the second air chambers 42 and 42A, and the third air chamber 43. The springs 51 and 51A sleeved on the first valve rod 5 and the second valve rod 5A are engaged with the bottom ends of the first air hole 46 and the second air hole 47, respectively. Upon the air valve 4 is secured with the valve seat 1, the pulleys 53 and 53A at the other ends of the first valve rod 5 and the second valve rod 5A are engaged with the disc 3.

The air valve 4 with the washer 7 and the valve seat 1 are secured to the base plate 83 of the air filter 8. The holes 831 and 832 of the base plate 8 are interconnected with the second air chambers 42 and 42A, while the exhausting chamber 833 is interconnected with the third air chamber 43.

To practice the present invention, as shown in FIGS. 3 through 5, the spindle 21 of the motor 2 links the disc 3 to spin by means of the pulleys 12 of the valve seat 1. Whereas the cam 31 of the disc 3 spins with respect to the first valve rod 5 and the second valve rod 5A, the pulleys 53 and 53A of the first valve rod 5 and the second valve rod 5A move along the first slanting surface 311 and the second slanting surface 312 of the cam 31 in a reciprocating movement to control the passages of the first air chamber 41, the second air chambers 42 and 42A, and the third air chamber 43, respectively.

For example, as shown in FIG. 3, when the cam 31 of the disc 3 is spinning with respect to the second valve rod 5A, the first slanting surface 311 of the cam 31 engages with the pulley 53A of the second valve rod 5A, so that when the valve rod 5A spins with the disc 3, the spring 51A is pressed and the second valve rod 5A moves in the second air hole 47, while the sealing ring 52A of the second valve rod 5A blocks the intersection between the second air hole 47 and the first air chamber 41, therefore, air from the air inlet 45 is blocked from entering into the second air chamber 42A. The exhausting air from the particle filter 82 flows through the second air chamber 42A and the second air hole 47 to the holder 61A of the second valve rod seat 6A, and expels from the notch 63A of the holder 61A to the third air chamber 43, due to the intersection between the third air chamber 43 and the exhausting chamber 833, the exhausting air then goes through the exhausting hole 834 of the exhausting chamber 833 of the base plate 83.

In the movement described above, as shown in FIG. 5, the first valve rod 5 is not activated by the cam 31 of the disc 3, so that the sealing ring 52 is not engaged with the first air chamber 41 interconnected with the air inlet 45, and stays contact with the holder 61 of the first valve rod seat 6. Thus air is blocked from entering the holder 61 of the first valve rod seat 6. The air from the first air chamber 41 goes through the holes 54 of the first valve rod 5, the first air hole 46, the second air chamber 42, and the hole 831 of the base plate 83 into the particle filter 82.

On the contrary, as shown in FIG. 6, the first valve rod 5 is activated while the second valve rod 5A is deactivated. (The air flows in an opposite direction from the aforesaid, therefore, it will not be described hereinafter.) The air in the first air chamber 41 will flow through the second air hole 47 and into the second air chamber 42A and the particle filter 82. The exhausting air from the particle filter 81 will flow through the second air chamber 42, the notch 63 of the first valve rod seat 6 in the first air hole 46 into the third air chamber 43, and then is expelled through the exhausting hole 834 of the exhausting chamber 833 on the base plate 83.

In the present invention, the motor 2 links the cam 31 of the disc 3 to spin, which maintains the first valve rod 5 and the second valve rod 5A in the air valve 4 to be activated in turn.

I claim:

1. A control valve structure for an oxygen machine comprising a valve seat, a motor, a disc, an air valve, a pair of first and second valve rods and a pair of first and second valve rod seats, being secured on an air filter of the oxygen machine;

said valve seat being provided with said disc linked by said motor, said disc comprising a cam, said cam having a first slanting surface and a second slanting surface at respective ends;

said air valve being secured with said valve seat on said air filter and comprising a first air chamber, a pair of second air chambers, and a third air chamber, all of said air chambers being formed longitudinally thereon and separated from one another, said first air chamber comprising an air inlet, said air valve further comprising a first air hole and a second air hole transversally interconnected with said first air chamber, said second air chambers and said third air chamber, respectively;

said first valve rod and said second valve rod being located in said first air hole and said second air hole of said air valve, with springs and sealing rings sleeved thereon, respectively, one end of each said valve rod comprising a pulley while another end of which comprising holes;

said first valve rod seat and said second valve rod seat comprising holders thereon with barrel holders therein, said holders comprising notches;

said air filter comprising a pair of particle filters and a base plate, said base plate comprising a pair of holes interconnected with said particle filters and an exhausting chamber, said exhausting chamber comprising an exhausting hole.

2. The control valve structure for an oxygen machine, as recited in claim 1, wherein in between said first air chamber, said second air chambers and said third air chamber of said air valve and said base plate is secured with a washer.

3. The control valve structure for an oxygen machine, as recited in claim 1, wherein said valve seat comprises pulleys at the position corresponding to said disc.

* * * * *